United States Patent [19]

Ortemond

[11] Patent Number: 4,563,109
[45] Date of Patent: Jan. 7, 1986

[54] CLAMPING APPARATUS FOR USE ON OFFSHORE PLATFORMS

[76] Inventor: Leon D. Ortemond, Rte. 2, Box 2290, Abbeville, La. 70510

[21] Appl. No.: 579,025
[22] Filed: Feb. 10, 1984
[51] Int. Cl.$^4$ ............................................. E02B 17/00
[52] U.S. Cl. ..................................... 405/195; 52/645; 24/514; 248/228; 405/303
[58] Field of Search ................... 405/195; 248/228, 72; 52/719, 665, 669; 403/387, 386; 24/512, 513, 514, 568, 569

[56] References Cited

U.S. PATENT DOCUMENTS

| | | | |
|---|---|---|---|
| 1,739,904 | 12/1929 | Kingston | 24/514 |
| 1,890,386 | 12/1932 | Kingston | 24/514 |
| 1,976,595 | 10/1934 | Asleson et al. | 52/647 X |
| 2,608,370 | 8/1952 | Pratt | 248/228 |
| 2,692,034 | 10/1954 | Tidwell | 52/645 X |
| 3,032,849 | 5/1962 | Cohen et al. | 24/569 |
| 3,084,893 | 4/1963 | Ruth | 248/228 |
| 3,130,821 | 4/1964 | Dunlap | 52/719 X |
| 3,713,613 | 1/1973 | Searls | 52/665 X |
| 3,736,629 | 6/1973 | Blake | 24/514 |
| 4,020,531 | 5/1977 | Ahrens et al. | 24/569 X |

Primary Examiner—Dennis L. Taylor
Attorney, Agent, or Firm—Browning, Bushman, Zamecki & Anderson

[57] ABSTRACT

A clamping apparatus for securing a structural member to an offshore platform of the type having generally horizontally extending, fixed framework beams, the apparatus including an engagement assembly for engaging the structural member to be secured, a releasable gripping assembly for releasably gripping at least one of the framework beams, the structural member being secured being positioned between the engagement assembly and the framework beam and a connecting assembly interconnecting the gripping assembly and the engagement member, the connecting assembly being operative to urge the engagement assembly toward the gripping assembly to thereby clamp the structural member between the framework beam and the engagement assembly.

12 Claims, 5 Drawing Figures

4,563,109

CLAMPING APPARATUS FOR USE ON OFFSHORE PLATFORMS

BACKGROUND OF THE INVENTION

The present invention relates to an apparatus for securing a structural member or the like to an offshore platform. More specifically, the present invention relates to a clamping apparatus for securing a structural member to a generally fixed framework beam of an offshore platform.

Offshore platforms used for the exploration (drilling) and production of oil and/or gas are commonly comprised of one or more platforms supported by a suitable framework comprised of generally horizontally-extending beams or structural members vertically-extending beams or structural members and various cross braces and support studs. The uppermost floor or deck of the platform is the point from which the bulk of drilling and/or production activities are normally conducted and on which may be positioned equipment such as cranes, pile driving rigs, drilling rigs, various production equipment, crew housing facilities, etc. It is common practice for such equipment and facilities to be mounted on skid beams which rest on the platform floor. In many cases, such as for example in the case of a crane resting on skid beams, it is necessary to secure the crane to the skid beams and in turn secure the skid beams to the platform. To accomplish the latter operation, the skid beams are normally secured to suitable horizontally extending, fixed framework beams by welding connecting pieces between the skid beams and the framework beams of the offshore platform. This poses several problems.

Welding is time consuming, and in the case of offshore drilling and/or producing, lost time rapidly escalates the cost of operations. Additionally, in the case of producing wells where the presence of natural gas near the offshore platform is quite common, it is necessary to shut in the well and cease production while the welding is taking place to avoid the possibility of explosion and fire. Even in the case of drilling activities, welding may necessitate tripping of the drill string and cessation of the drilling to avoid the possibility of fire and explosion from linkage of natural gas in the event a high pressure gas formation is suddenly encountered. Lastly, unless the welding is carefully conducted, the welds may not be as strong as desired. It will be apparent that in cases where, for example, a crane is mounted on skid beams which are secured by welding to the structural beams of an offshore platform, failure of the welds securing the skid beams to the structural beams could result in toppling of the crane with serious injury to the rig crew and possible severe damage to the platform.

SUMMARY OF THE INVENTION

It is therefore an object of the present invention to provide an improved apparatus for securing structural members to offshore platforms.

Another object of the present invention is to provide a clamping apparatus for securing structural members such as skid beams to offshore platforms.

A further object of the present invention is to provide an apparatus for securing structural members to offshore platforms without the necessity for welding.

These and other objects of the present invention will become apparent from the drawings, the description given herein and the appended claims.

The clamping apparatus of the present invention is used to secure a structural member, e.g. a skid beam, to an offshore platform which has generally horizontally extending, fixed framework beams. The apparatus includes an engagement means which engages the structural member and a releasable grip means for releasably gripping at least one of the framework beams of the offshore platform. The structural member is positioned between the engagement means and the framework beam of the offshore platform, and there are provided connecting means which interconnect the grip means and the engagement means. The connecting means includes means operative to urge the engagement means toward the grip means with the result that the structural member is clamped or held between the fixed beam of the offshore platform and the engagement means.

DESCRIPTION OF THE PREFERRED EMBODIMENT

Figure 1:
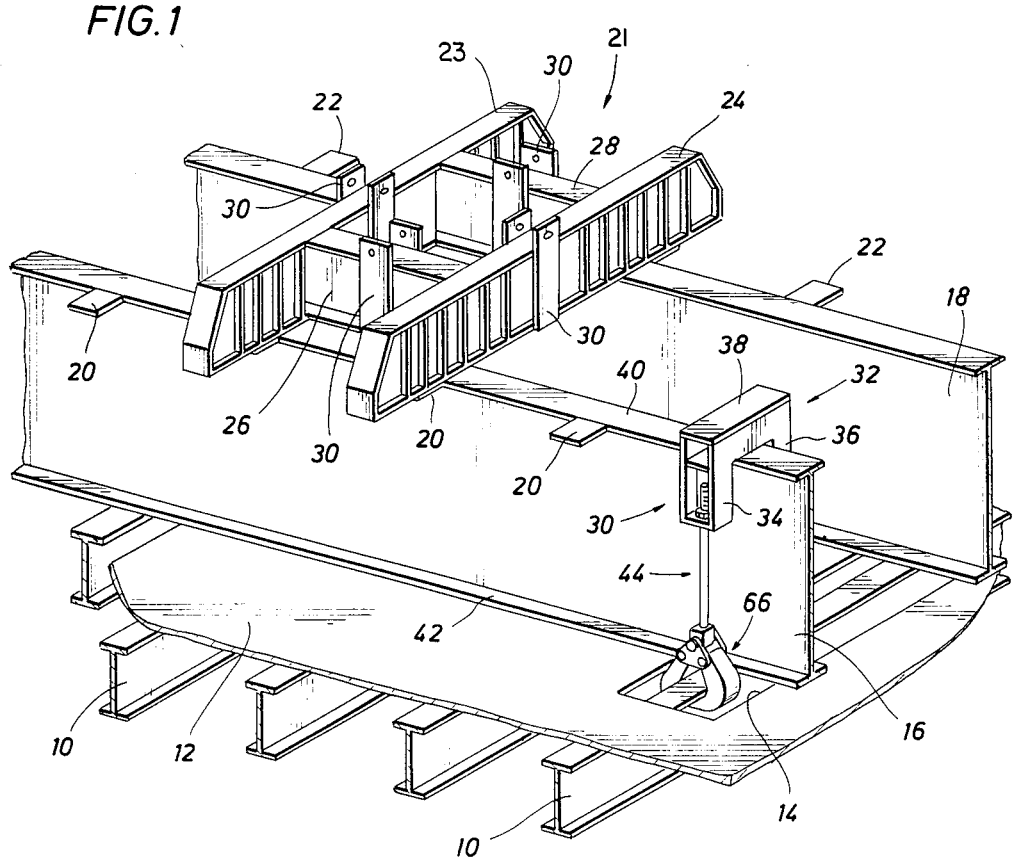
FIG. 1 is a perspective view showing the clamping apparatus of the present invention securing a skid beam to a typical beam of an offshore platform.

The detailed construction of a typical offshore oil rig or platform is well known by those skilled in the art and forms no part of the present invention. Accordingly, such a rig or platform will be described herein only to the extent necessary to enable an understanding of the workings of the clamping apparatus of the present invention. Referring first to FIG. 1, there is shown a portion of a typical offshore platform comprised of generally horizontally extending, fixed framework beams 10 which, in the usual case are steel I-beams. It will be appreciated that the I-beams 10 form only a small part of a framework comprised of vertical members (not shown) including the actual platform legs (not shown) which extend from the bed beneath the body of water vertically upward to above the surface of the water for the desired distance. The framework also includes numerous cross pieces (not shown) to interconnect the beams 10 as well as suitable bracing (not shown) to form a sturdy, rigid framework capable of withstanding adverse weather conditions and supporting extremely heavy loads. Overlying the I-beams 10 and supported thereby is decking 12 generally formed of steel plate or the like. Commonly, the I-beams 10, at certain locations on the platform deck, are left exposed, i.e. they are not covered with decking 12. However, in cases where the decking 12 completely overlies the I-beams 10, the decking 12 can be cutaway with a pneumatic saw or the like to provide an opening 14 in the decking 12 whereby a portion of the I-beam 10 will be exposed.

Supported on the decking 12 are spaced apart, generally parallel aligned, skid beams 16 and 18. Skid beams 16, 18 are provided with laterally extending flanges 20 and 22, respectively, which form positionary and attachment surfaces (e.g. by welding) for various equipment or the like supported by skid beams 16, 18. In the embodiment shown in FIG. 1, skid beams 16, 18 have a cross-sectional configuration which is generally that of an I-beam. However, it will be understood that skid beams 16, 18 can be any type of structural member having virtually any desired shape.

Skid beams 16, 18, as noted above, are used to support numerous types of equipment and facilities commonly used on offshore platforms. For example, the skid beams can be used to support cranes, drilling rigs, workover rigs, housing facilities, production equipment and the like. In the embodiment shown in FIG. 1, there is shown the sub-base 21 of a crane (not shown). Sub-base 21 is comprised of reinforced, parallel spaced members 23 and 24 connected by cross braces 26 and 28. As can be seen, members 23 and 24 lie transverse to skid beams 16 and 18 and are positioned on and affixed to support flanges 20 and 22. Secured to members 23 and 24 and cross braces 26 and 28 are a series of upstanding brackets 30 to which the pedestal or base of a typical crane can be secured in a well known manner.

To secure the structural members or skid beams 16 and 18 to the offshore platform, a clamping apparatus shown generally at 30 and including an engagement assembly 32, a connecting assembly 44 and a grip assembly 66 is employed. While only one such clamping apparatus 30 is shown, it will be appreciated that in the usual case, and for the embodiment shown in FIG. 1, at least four of such clamping apparatuses 30 would be used so as to clamp each end of the skid beams 16 and 18 securely to the offshore platform.

Figure 2:
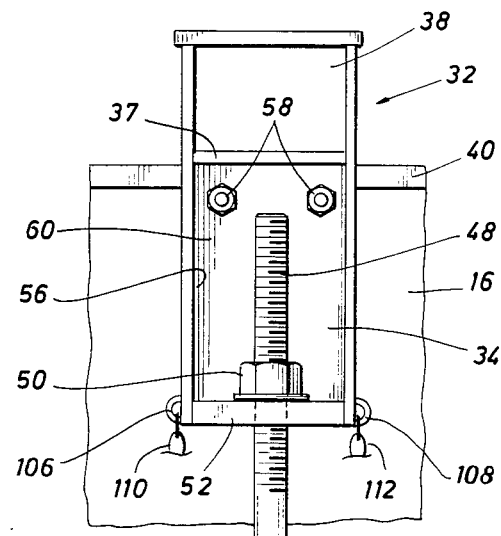
FIG. 2 is a side, elevational view, partly in section, of the clamping apparatus of the present invention.
Figure 3:
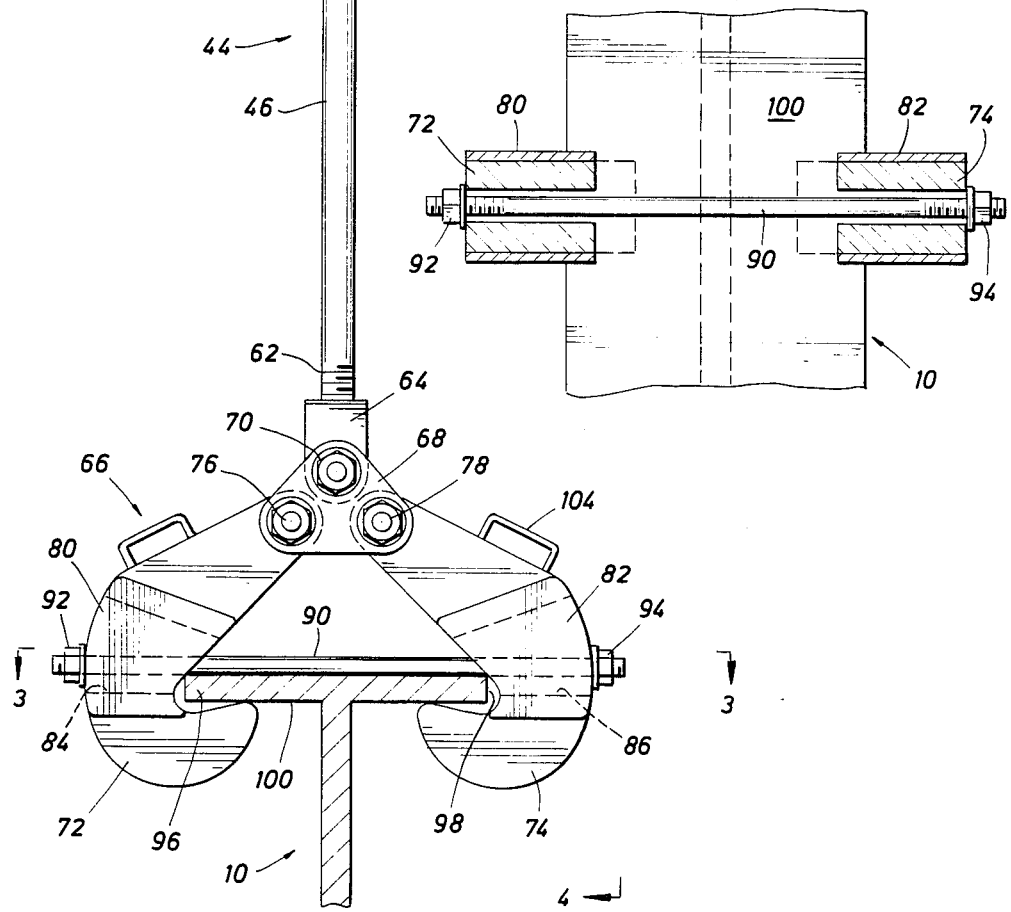
FIG. 3 is a view, partly in section, taken along the line 3—3 of FIG. 2.
Figure 4:
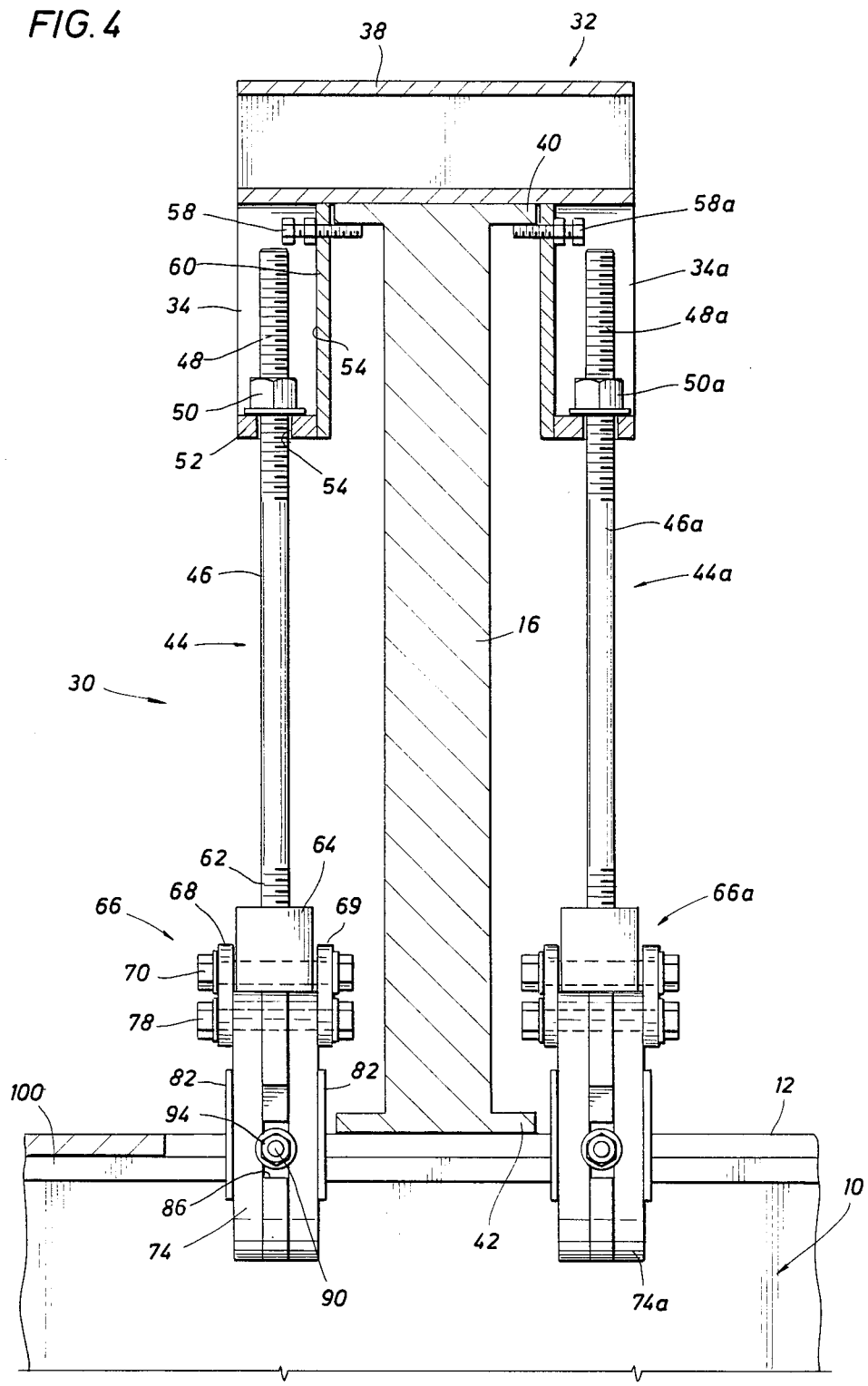
FIG. 4 is a view taken along the line 4—4 of FIG. 2.

Clamping apparatus 30, as seen more fully with reference to FIGS. 2, 3 and 4, is comprised of a U-shaped yoke or engagement assembly 32 having first and second arms 34 and 34a adjoined by a cross piece 38. As best seen with reference to FIG. 4, skid beam 16 is received between arms 34 and 34a, cross arm 40 of skid beam 16 being in engagement with an engagement plate 37 of cross piece 38 of yoke assembly 32. The other cross arm 42 of skid beam 16 rests on the decking 12 such that skid beam 16 is thereby positioned between yoke assembly 32 and beam 10.

A first connecting assembly, shown generally as 44, and comprised of a rod member 46 having a threaded end 48 and a threaded nut 50 received on threaded end 48 is attached to arm 34 of yoke assembly 32. For this purpose, arm 34 is provided with a plate 52 having an aperture 54 through which the threaded end 48 of rod 46 extends. As best seen with reference to FIG. 2, a pocket 56 is formed in arm 34, the threaded end 48 of rod 46 and nut 50 being received in pocket 56. Threaded bolts 58 are received in a wall 60 of arm 34 for the purpose of preventing shifting or rocking of yoke assembly 32 once it is positioned over skid beam 16.

The other end of rod member 46 is also threaded as at 62 and is received in a tapped I-pad 64. Secured to I-pad 64, and hence to connecting assembly 44, is a gripping assembly 66.

Gripping assembly 66 is comprised of first and second bracket plates 68 and 69 secured to opposite pairs of I-pad 64 by means of a nut and bolt assembly 70 received in a cross bore in I-pad 64 and registering bores in brackets 68 and 69. Pivotally secured to bracket plates 68 and 69 are first and second hook members 72 and 74, hook members 72 and 74 being secured to brackets 68 and 69 by means of bolt and nut assemblies 76 and 78, respectively. Hook assemblies 72 and 74 include reinforcing plates 80 and 82, respectively. Hook assemblies 72 and 74 are provided with slots 84 and 86, respectively, through which extends a stud 90 threaded at its opposed ends, the threaded ends receiving complementary threaded nuts 92 and 94, respectively. As best seen with reference to FIGS. 2 and 3, when hook members 72 and 74 are properly positioned over the lateral edges 96 and 98 of cross arm 100 of I-beam 10 and urged toward one another by means of threaded stud 90 and nuts 92 and 94, beam 10 will be securely gripped by grip assembly 66.

Secured to the second arm 34a of yoke assembly 32 is a second connecting assembly 44a which in turn is connected to a second grip assembly 66a, connecting assembly 44a and grip assembly 66a, as seen, being substantially the same as connecting assembly 44 and grip assembly 66, respectively. Accordingly, for purposes of description, parts of assemblies 34a, 44a and 66a corresponding to like parts of assemblies 34, 44 and 66 will be given like numbers with the addition of the letter "a."

Figure 5:
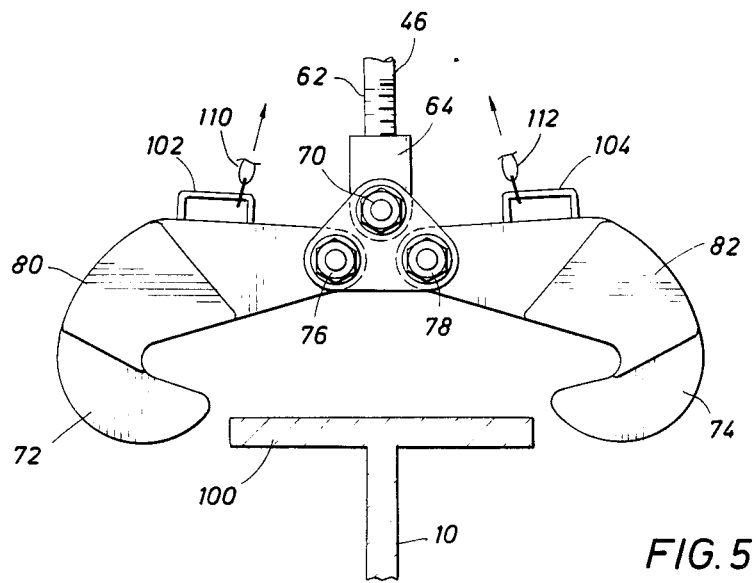
FIG. 5 is an elevational view showing the grip means of the clamping mechanism in the open position.

In the use of the clamping apparatus of the present invention, to secure a structural member or the like such as skid beams 16 or 18 to an offshore platform, the yoke assembly 32 is positioned over the structural member 16 or 18 as shown in FIGS. 1 and 4. With the hook assemblies 66, 66a in the open position (see FIG. 5), the connecting assemblies 44, 44a are loosened, i.e. rods 46, 46a are retracted from arms 34 and 34a, respectively, until the hook assemblies 66, 66a can be positioned adjacent the lateral edges 96, 98 of beam 10. To open hook assemblies 66, 66a, hook members 72 and 74 are provided with eyes 102 and 104, respectively, which can be engaged with hook and line assemblies 110, 112, respectively, whereby hook members 72 and 74 may be pulled upwardly and hence to an open position as the hook members pivot on bracket plates 68 and 69. Hook members 72 and 74 are retained in the open position until positioned by attaching hook and line assemblies 110, 112 to eyes 106 and 108, respectively, on arm 34. The hook assemblies 66, 66a are then closed, hook members 72 and 74 being urged together by means of the threaded stud 90 in conjunction with nuts 92 and 94 such that cross arm 90 is now gripped by hook members 72 and 74 as shown in FIG. 2. The nuts 50, 50a are then threaded onto the threaded portions 48, 48a of rods 46, 46a, respectively, until yoke assembly 32 is drawn into tight engagement with beam 16. It will thus be seen that skid beam 16 will be tightly secured to beam 10 by virtue of being clamped between beam 10 and engagement or yoke assembly 32.

It will be appreciated that in like manner, three additional clamping apparatuses such as apparatus 30 shown in FIG. 1, will likewise be used to secure the other end of skid beam 16 and the opposite ends of skid beam 18. In this manner, skid beams 16 and 18 will be secured to the offshore platform without any necessity for welding the skid beams, either directly or by means of connecting pieces, to any portion of the offshore platform.

Because the clamping apparatus of the present invention need not be welded, either to the structural member, e.g. skid beam, to be secured, or to the framework beam of the offshore platform, it can easily be moved longitudinally along the skid beam so as to be readily positioned on an available framework beam of the offshore platform. It will also be apparent that the unique construction of the grip means having the adjustable jaws permits the clamping apparatus to be adapted to various sizes of framework beams. With prior art systems, where it was generally necessary to weld the skid beam to the girder beams of the platform in order to move the skid beams, it was necessary to burn off the weld. Burning off of the weld not only may necessitate a shutting in of production of the well to avoid explosion and/or fire, it also can change the metallurgy of the skid beams perhaps rendering them unsafe as suitable support members. Using the clamps of the present invention, welding is unnecessary with the result that the securing operation can be carried out faster and cheaper without any damage to the skid beam. A particular advantage of the clamping apparatus of the present invention is in the erection of large cranes on offshore platforms. Such cranes, of necessity, must be mounted on skid beams so that they can be moved around the platform to conduct the various lifting operations needed. It will be appreciated that it may be necessary in certain operations to move the crane at somewhat frequent intervals. Since the clamping apparatus of the present invention eliminates any need for welding, movement of such large cranes can be done easily and quickly.

The term "structural member," as used herein, is not intended to be limited to any particular shape or size of structural member, beam or the like. Indeed, the clamping apparatus of the present invention can be used to secure virtually any object to an offshore platform, and it will be recognized to those skilled in the art that the shape of the yoke or engagement assembly can easily be varied to accommodate the shape of the particular object being secured.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A clamping apparatus for securing a structural member to an offshore platform having generally horizontally extending, fixed framework beams comprising:
   engagement means for operatively engaging a first side of said structural member, the opposite side of which engages said fixed framework beams;
   releasable grip means for releasably gripping at least one of said beams; and
   connecting means individually interconnecting said grip means and said engagement means, said connecting means including means operative to cause relative movement between said engagement means and said grip means to thereby clamp said structural member between said beam and said engagement means.

2. The clamping apparatus of claim 1 wherein said engagement means comprises a generally U-shaped yoke member having first and second arms adjoined by a cross piece, said structural member being received between said first and second arms.

3. The clamping apparatus of claim 1 wherein said releasable grip means comprises bracket means and first and second hook means pivotally secured to said bracket means.

4. The clamping apparatus of claim 1 wherein said connecting means comprises a rod member and means to selectively vary the distance along said rod member between said engagement means and each said releasable grip means.

5. The clamping apparatus of claim 4 wherein said rod member has at least one threaded end and said connecting means further includes a nut means threadedly received on said threaded end.

6. The clamping apparatus of claim 5 wherein said threaded end of said rod and said nut means are connected to said engagement means.

7. The clamping apparatus of claim 4 including means for urging said first and second hook means toward one another when said first and second hook means are in gripping engagement with said beam.

8. The clamping apparatus of claim 2 wherein said releasable grip means includes a first hook assembly interconnected to said first arm of said yoke and a second hook assembly interconnected to said second arm of said yoke, each of said hook assemblies comprising bracket means and first and second hook means pivotally secured to said bracket means.

9. The clamping apparatus of claim 8 wherein said connecting means comprises a first rod member interconnected between said first arm of said yoke and said first hook assembly and a second rod member interconnected between said second arm of said yoke and said second hook assembly, said connecting means further including means to selectively vary the distance along each of said rod members between each of said respective arms and said hook assemblies.

10. The clamping apparatus of claim 9 wherein at least one end of each of said rod members is threaded and there are provided first and second nut means for threadedly engaging said threaded ends of said first and second rod members, respectively.

11. The clamping apparatus of claim 10 wherein said threaded ends of said rod members and said nut means are connected to said yoke member.

12. The clamping apparatus of claim 8 including means for urging said first and second hook means toward one another when said first and second hook means are in gripping engagement with said beam.

* * * * *